(12) United States Patent
Yang et al.

(10) Patent No.: US 8,415,408 B2
(45) Date of Patent: Apr. 9, 2013

(54) GERMS RESISTING AND SELF CLEANING INFILTRATION THIN FILM AND MANUFACTURING METHOD THEREOF

(75) Inventors: Cheng-Chien Yang, Longtan Township, Taoyuan County (TW); Kuo-Hui Wu, Taoyuan (TW); Wang-Tsai Gu, Longtan Township, Taoyuan County (TW); Yu-Zen Hsieh, Chiayi (TW); Mang-Zhi Wu, Zhuangwei Township, Yilan County (TW)

(73) Assignee: Chung-Shan Institute of Science and Technology, Armaments Bureau of National Defense, Taoyuan County (TW)

( * ) Notice: Subject to any disclaimer, the term of this patent is extended or adjusted under 35 U.S.C. 154(b) by 112 days.

(21) Appl. No.: 12/731,424

(22) Filed: Mar. 25, 2010

(65) Prior Publication Data

US 2011/0237706 A1  Sep. 29, 2011

(51) Int. Cl.
 *C08K 3/10* (2006.01)
 *C08K 3/22* (2006.01)
 *C08K 5/16* (2006.01)

(52) U.S. Cl.
 USPC ............ 523/122; 524/251; 524/403; 524/430

(58) Field of Classification Search .................. 523/122; 524/403, 430, 251
 See application file for complete search history.

(56) References Cited

U.S. PATENT DOCUMENTS

2005/0216075 A1* 9/2005 Wang et al. ................... 623/1.15
2010/0178268 A1* 7/2010 Bukshpan et al. .......... 424/78.08

* cited by examiner

*Primary Examiner* — Kriellion Sanders

(57) ABSTRACT

The invention provides a germs resisting and self-cleaning infiltration thin film and manufacturing method thereof. At first, a Polyethyleneimine (PEI) and a Polyvinyl Alcohol (PVA) are used to make a polymer thin film. Then, a germ resistant and an inorganic metal oxide are added into the polymer thin film to form the selective infiltration thin film capable of resisting germs and self-cleaning.

2 Claims, 3 Drawing Sheets

Figure 1:
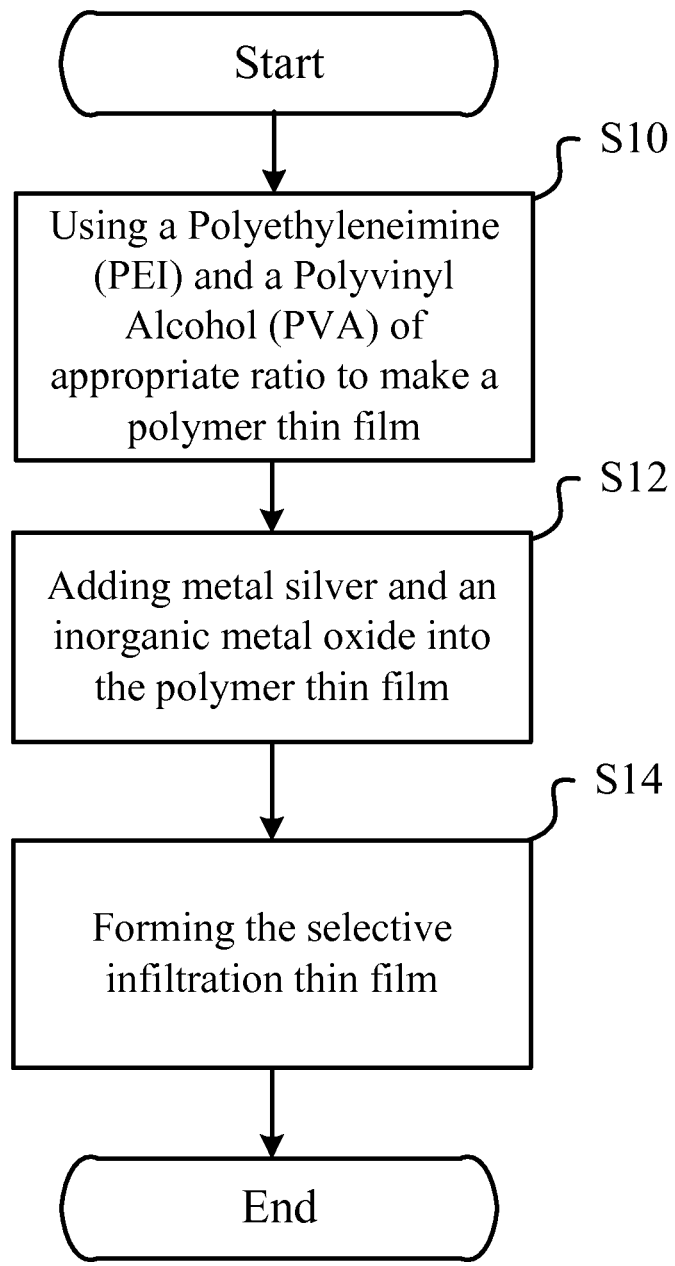

GERMS RESISTING AND SELF CLEANING INFILTRATION THIN FILM AND MANUFACTURING METHOD THEREOF

BACKGROUND OF THE INVENTION

1. Field of the Invention

The present invention relates to a thin film, and more particularly, to a selective infiltration thin film capable of resisting germs and self-cleaning, as well as a manufacturing method thereof.

2. Description of the Prior Art

At present, most isolation protective clothing is made of nonwoven cloth to prevent liquid contaminants. The protective clothing of nonwoven cloth can not avoid gas contaminants, which therefore is a goal to be reached by the instant invention.

SUMMARY OF THE INVENTION

Therefore, one of the goals of the invention is to provide a selective infiltration thin film capable of resisting germs and self-cleaning.

According to an embodiment of the invention, the selective infiltration thin film manufacturing method includes the following steps of: (a) using a Polyethyleneimine (PEI) and a Polyvinyl Alcohol (PVA) of appropriate ratio to make a polymer thin film; (b) adding a germ resistant and an inorganic metal oxide into the polymer thin film; (c) forming the selective infiltration thin film.

In practical applications, the selective infiltration thin film can be a protection material for biological and chemical protection or environment protection. The casting method is used to mix the Polyethyleneimine (PEI) and the Polyvinyl Alcohol (PVA) to form the polymer thin film having an interpenetrating network structure and gas permeability. The inorganic metal oxide can be Polyoxometalate (POM). The quantitative suspension test and the bacteriostatic ring test can be further used to test the germs resisting capability of the selective infiltration thin film, and the vapor permeability test and the chemical permeation experiment can be used to test the self-cleaning capability of the selective infiltration thin film.

Another embodiment of the invention is a selective infiltration thin film. The selective infiltration thin film includes a Polyethyleneimine (PEI), a Polyvinyl Alcohol (PVA), a germ resistant (e.g., a metal silver), and an inorganic metal oxide. Wherein, a Polyethyleneimine (PEI) and a Polyvinyl Alcohol (PVA) of appropriate ratio are used to make a polymer thin film, and the metal silver and the inorganic metal oxide are added to form the selective infiltration thin film.

In practical applications, the selective infiltration thin film can be a protection material for biological and chemical protection or environment protection. The casting method is used to mix the Polyethyleneimine (PEI) and the Polyvinyl Alcohol (PVA) to form the polymer thin film having an interpenetrating network structure and gas permeability. The inorganic metal oxide can be Polyoxometalate (POM). The quantitative suspension test and the bacteriostatic ring test can be further used to test the germs resisting capability of the selective infiltration thin film, and the vapor permeability test and the chemical permeation experiment can be used to test the self-cleaning capability of the selective infiltration thin film.

Above all, the invention uses a Polyethyleneimine (PEI) and a Polyvinyl Alcohol (PVA) of appropriate ratio to make a polymer thin film, and the metal silver and the inorganic metal oxide are added to form the self-cleaning selective infiltration thin film. Since the metal silver can effectively resist the bacteria, viruses, fungi, and fungal, and the inorganic metal oxide with photocatalytic activity can provide the organic pollutants catalysis and degradation effect, so that the metal silver and the inorganic metal oxide can be combined to obtain the selective infiltration thin film capable of resisting germs and self-cleaning.

After tests, it is found that the selective infiltration thin film provided by the invention has an improved effect of resisting and biological bacteria and chemical poisons, therefore it can be used as the protection material in bio-chemical/environment protection, such as the fiber, the film, and the thin film, and it can be made into protection apparatus and clothing to guard the health and safety of the industry chemical processor, the medical worker, or the environmental cleaner.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 1 illustrates a flowchart of the selective infiltration thin film manufacturing method of an embodiment of the invention.

Figure 2A:
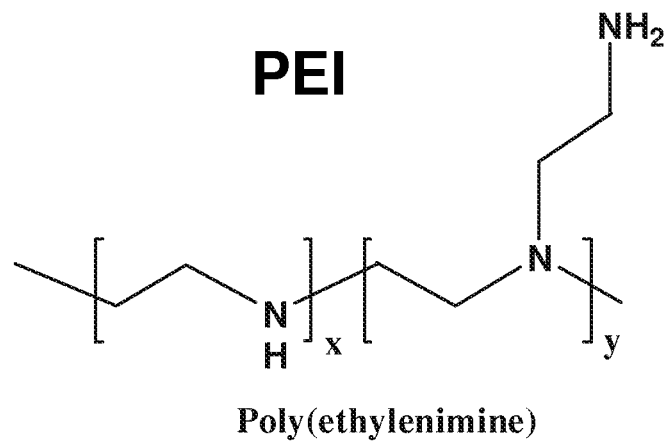
Figure 2B:
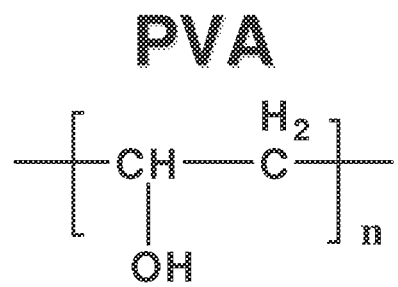

FIG. 2(A) and FIG. 2(B) illustrate the chemical structure equations of Polyethyleneimine (PEI) and Polyvinyl Alcohol (PVA) respectively.

Figure 3:
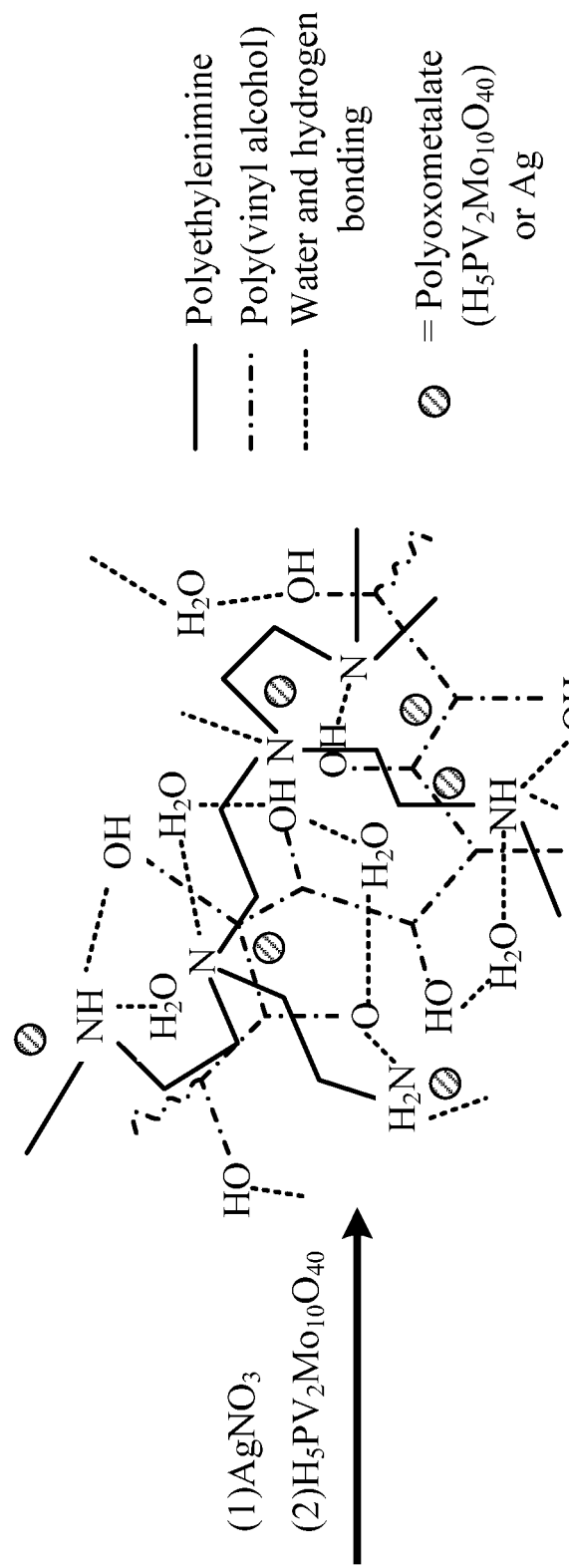

FIG. 3 illustrates a scheme diagram of the selective infiltration thin film of another embodiment of the invention.

DETAILED DESCRIPTION OF THE INVENTION

The invention provides a selective infiltration thin film capable of resisting germs and self-cleaning and a manufacturing method thereof.

In order to effectively solve the problems in the prior arts, the catalyst which can be degraded by reacting with the poisons or the materials capable of killing bacteria and germs can be added into the protection material. For example, the catalyst or germs resisting material can be added into the polymer material, or in the electrospray wire form.

For the germs resisting material, the polyoxometalate or silver having good germs resisting ability can be added to effectively resisting bacteria, viruses, mold, and fungus, such as *escherichia coli* and aureus. Therefore, it is a good option to use Polyoxometalate for degrading poisons and resisting germs.

An embodiment of the invention is a selective infiltration thin film manufacturing method. As shown in FIG. 1, at first, in step S10, using a Polyethyleneimine (PEI) and a Polyvinyl Alcohol (PVA) of appropriate ratio to make a polymer thin film. The chemical structure equations of PEI and PVA are shown in FIG. 2(A) and FIG. 2(B).

PVA is a common water-soluble polymer. PVA thin film has good oxygen infiltration protection property under lower humidity; it can be 2 to 4 times to LDPE. For example, the same oxygen infiltration protection effect can be achieved by the PVA film of width 10 μm and the LDPE film of width 37 μm.

Since the PVA and PP mixed polymer thin film has a better ability of gas-stopping, about 130 times to that of the pure PP thin film, and since the oxygen penetrating rate of the modified Polyamide (PA) thin film is 20 times to that of the PVA thin film, PVA and PA can be doped to increase the gas-stopping property of the PA. As to Polyethyleneimine (PEI), PEI is a polymer with an amino dendritic structure. Since amine is a highly reactive nucleophilic functional group, PEI has been widely used in the applications for adhesive purpose, or coatings, textiles, food packaging, and cosmetics.

In applications, the casting method is used to mix the PEI and the PVA to form the polymer thin film, which is tough and soft. Since the PEI and the PVA will form an interpenetrating network structure in the polymer thin film, its moisture is about 10% and there are a lot of intermolecular hydrogen bonds existed in the polymer thin film.

Next, in step S12 and S14, a germ resistant (the metal silver) and an inorganic metal oxide are added into the polymer thin film to form the selective infiltration thin film. The germ resistant (the metal silver) provides the germs resisting ability for the selective infiltration thin film, and the inorganic metal oxide provides the organic pollutant resisting ability. Besides the metal silver, the germ resistant can be any materials of resisting/killing germs. The inorganic metal oxide can be Polyoxometalate (POM).

In practical applications, the germs resisting material is formed by adding the germ resistant to the material. In general, it is not necessary for the germ resistant to kill the germs rapidly; on the contrary, it focuses on suppressing the growth and reproduction of the germs in a long period. Generally speaking, the germ resistant can be divided into several types of inorganic, organic, and natural. The inorganic germ resistant can be further divided into a metal ion type germ resistant, a light catalytic type germ resistant, and a composite germ resistant. The metal ion type germ resistant uses the germs resisting ability of the metals silver, copper, or zinc to fix the metals silver, copper, zinc, or their ions on the surface of the porous material (e.g, zeolite, silica gel) through the physical adhering method and the ion exchanging method When the silver ion ($Ag^+$) contacts with the microbial membrane, the coulomb attraction force makes the negative-charged cell membrane firmly combined with the silver ion ($Ag^+$), the silver ion ($Ag^+$) will penetrate the cell wall into the cell and react with the hydrogen sulfur functional group to destruct the activity of cell synthase, the cell will lose the ability to proliferate cell and died. After the cell is killed by the silver ion ($Ag^+$), the silver ion ($Ag^+$) will get out of the dead cell and contact with other cells to repeat the above-mentioned reactions. Therefore, the silver ion ($Ag^+$) can continuously kill the germs for a long period of time.

Various manufacturing methods can be used to mix the silver germ resistant with different polymers. Since the main effect of the silver germ resistant is to contact the germs and kill them, the silver germ resistant as an adder should be uniformly distributed on the surface of the product. The inorganic germ resistant is most suitable for fiber, plastic, and construction materials. Thus, the invention uses the silver germ resistant as the germ resistant, added into the selective infiltration thin film.

The inorganic metal oxide used in the invention is polyoxometalates, also called heteropoly acid compounds, and is the poly-metal-oxide clusters formed by the simple condensation of the inorganic oxygen-containing acid. Because the intermediate product having oxidation inhibition ability will be generated during the process of the organic matter decomposition by titanium dioxide ($TiO_2$), the photocatalytic material having different operation mechanisms (e.g., the polyoxometalate having similar catalytic ability to $TiO_2$) should be cooperated.

In practical applications, the polyoxometalates can be applied to photocatalytic decomposition of organic pollutants in water, for example, using $K_4W_{10}O_{32}$, $H_3PW_{12}O_{40}$, $H_4SiW_{12}P_{40}$, $K_4SiW_{12}O_{40}$, $K_6H[_2OMn^{II}SiW_{11}O_{39}]$, and $K_6[H_2OCu^{II}SiW_{11}O_{39}]$ as photocatalyst to effectively decompose organic compounds such as a chloroacetic acid, a p-cresol, a methyl chloroform. In addition, the polyoxometalate can be applied to the fuel cell, such as $H_3PMo_{12}O_{40}$ and $H_3PW_{12}O_{40}$ can be reacted with CO poisoning the catalyst of the fuel cell. The polyoxometalates after the reduction reaction can be processed by a re-oxidation reaction on the positive pole of the fuel cell to generate power. It should be noticed that the polyoxometalates also has bioactivity, especially in anti-virus aspect. Polyoxometalates have properties of anti-HIV, anti-cancer and anti-influenza virus. Therefore, in the invention the inorganic polyoxometalates are added into the selective infiltration thin film.

After the selective infiltration thin film is formed, one can further uses the quantitative suspension test and the bacteriostatic ring test to test the germs resisting capability of the selective infiltration thin film, and the sulfur poisons can be selected to perform the vapor permeability test and the chemical permeation experiment to test the self-cleaning capability of the selective infiltration thin film.

In this embodiment, the *staphylococcus aureus* (8099 ATCC 25923), the *bacillus subtilis*, the *pseudomonas aeruginosa* (8099 ATCC 27853), and the *Escherichia coli* are used as the target germ. The Mueller Hinton Broth (MHB) is used to nurture strains and at 37° C. overnight aerobic cultivation in a thermostat incubator. On the other hand, different proportions of Polymer/Ag and Polymer/POM are added into the culture medium in an incremental way to perform a series of dilutions. At last, the observed germs are inoculated in the medium under the germ concentration of $10^7$ cfu (number of germs)/ml to observe that what concentration of the Polymer/Ag and the Polymer/POM can stop the growth of the germs (Minimum Inhibitory Concentration, MIC) or kill the germs (Minimum Bactericidal Concentration, MBC). Therefore, the quantitative suspension test and the bacteriostatic ring test can be used to test the germs resisting capability of the composite material.

The invention teaches mixing PEI, PVA, POM, and Ag to make the selective infiltration thin film and the anti-bacterial fabric to test the effects of permeability, antibacterial activity, and oxidation degrading poisons of the selective infiltration thin film. According to the test result, it can be found that Polymer/POM and Polymer/Ag thin film and weaving have permeability, and its germs resisting ability comes from the $NH_2$ of PEI, the germ killing mechanism of POM negative charge and the Ag ion. Selective permeability films show a very strong anti-bacterial characteristic to *E. coli, staphylococcus aureus, pseudomonas aeruginosa*, and *bacillus subtilis*. As to the aspect of anti-virus, the selective infiltration film oxygenates the poisons to the non-poison matters, while the $NH_2$ of PEI has the function of catching poisons, and the change of the color would alert people. Therefore, the selective infiltration film has the ability of resisting germs and oxygenating the poisons to achieve the self-cleaning function and the protection function. Thus, the selective infiltration film of the invention has great developing potential to be used as germs resisting and bio-chemical protection material in the future.

In the thin film germs resisting characteristic test, the bacteriostatic circle is used for the qualitative test; the steps are described as follows. After a wafer paper spindles (6 mm) is sterilized at 120° C., the wafer paper spindles will be immersed into the Polymer/POM and Polymer/Ag solutions. Then, the immersed wafer paper spindles will be disposed in the vaccinated strain ($10^5$ cfu/ml) Mueller Hinton ager (MHA) disk. Afterward, it will be trained 24 hours in the constant temperature incubator at 37° C., and the size of its bacteriostatic circle will be measured. The test results are shown in Table 1 to Table 4.

TABLE 1 the size of the bacteriostatic circle of Polymer/POM thin film germs resisting experiment (mm)

| Strain | Polymer | Polymer/POM-3 | Polymer/POM-5 | Polymer/POM-8 | Polymer/POM-10 |
|---|---|---|---|---|---|
| Escherichia coli | 10.97 | 11.75 | 12.10 | 12.39 | 12.84 |
| Pseudomonas aeruginosa | 13.49 | 13.61 | 13.61 | 13.86 | 14.26 |
| Staphylococcus aureus | 13.73 | 13.78 | 13.98 | 14.03 | 14.45 |
| Bacillus subtilis | 14.09 | 14.26 | 14.52 | 15.22 | 15.63 |

Table 1 shows the results of the qualitative test experiment of the bacteriostatic circle using the Polymer/POM thin films of different proportions to *Escherichia coli, Pseudomonas aeruginosa, Staphylococcus aureus*, and *Bacillus subtilis* respectively. From the results shown in Table 1, it can be found that the Polymer without POM also has the germs resisting effect. It is mainly because that the functional group—$NH_2$ on the PEI can have the germs resisting effect. With the increasing of the proportion of POM in Polymer/POM, the bacteriostatic circle will also become larger which proves that POM has a certain degree of germs resisting effect, and the effect is especially obvious to the Gram-positive bacteria such as *Staphylococcus aureus*, and *Bacillus subtilis*, caused by the negative-charged POM ($PV_2Mo_{10}O_{40}^{5-}$).

TABLE 2 the size of the bacteriostatic circle of Polymer/Ag thin film germs resisting experiment (mm)

| Strain | Polymer | Polymer/Ag-0.3 | Polymer/Ag-0.5 | Polymer/Ag-1 | Polymer/Ag-3 |
|---|---|---|---|---|---|
| Escherichia coli | 10.38 | 11.96 | 12.46 | 13.51 | 15.75 |
| Pseudomonas aeruginosa | 10.31 | 12.95 | 14.15 | 15.12 | 17.11 |
| Staphylococcus aureus | 10.35 | 11.34 | 12.55 | 13.42 | 17.81 |
| Bacillus subtilis | 10.30 | 12.50 | 13.43 | 14.85 | 16.24 |

Table 2 shows the results of the qualitative test experiment of the bacteriostatic circle using the Polymer/Ag thin films of different proportions to *Escherichia coli, Pseudomonas aeruginosa, Staphylococcus aureus*, and *Bacillus subtilis* respectively. From the results shown in Table 2, it can be found that with the increasing of Ag in the Polymer, the bacteriostatic circle will also become larger in a certain degree to prove that Ag has a certain degree of germs resisting effect.

Comparing the above-mentioned Table 1 and Table 2, it can be found that the Polymer/Ag thin film has better germs resisting effect than the Polymer/POM thin film. No matter the Gram-positive bacteria or negative bacteria, the Polymer/Ag thin film has good germs resisting effect. That is to say, the metal silver (Ag) added into the selective infiltration thin film can effectively provide good germs resisting effect to the selective infiltration thin film.

TABLE 3 the size of the bacteriostatic circle of Polymer/Ag nonwoven cloth germs resisting experiment (mm)

| Strain | Polymer | Polymer/Ag-0.3 | Polymer/Ag-0.5 | Polymer/Ag-1 | Polymer/Ag-3 |
|---|---|---|---|---|---|
| Escherichia coli | 14.13 | 15.84 | 16.75 | 17.42 | 19.37 |
| Pseudomonas aeruginosa | 14.93 | 16.17 | 17.68 | 18.23 | 22.81 |
| Staphylococcus aureus | 18.35 | 18.82 | 18.97 | 19.55 | 22.59 |
| Bacillus subtilis | 17.84 | 18.46 | 19.00 | 19.10 | 22.47 |

TABLE 4 the size of the bacteriostatic circle of Polymer/POM nonwoven cloth germs resisting experiment (mm)

| Strain | Polymer | Polymer/POM-3 | Polymer/POM-5 | Polymer/POM-8 | Polymer/POM-10 |
|---|---|---|---|---|---|
| Escherichia coli | 14.64 | 15.74 | 16.12 | 16.16 | 17.97 |
| Pseudomonas aeruginosa | 16.12 | 16.36 | 16.82 | 17.58 | 18.08 |
| Staphylococcus aureus | 15.78 | 17.67 | 17.97 | 18.16 | 19.53 |
| Bacillus subtilis | 15.71 | 16.72 | 17.83 | 18.07 | 18.60 |

Table 3 and Table 4 show the results of the qualitative test experiment of the bacteriostatic circle using the Polymer/Ag nonwoven cloth and the Polymer/POM nonwoven cloth of different proportions to *Escherichia coli, Pseudomonas aeruginosa, Staphylococcus aureus*, and *Bacillus subtilis* respectively. From the results shown in Table 3 and Table 4, it can be found that after the Polymer/POM thin film and the Polymer/Ag thin film are combined with the nonwoven clothes, and the germs resisting effect can be still shown. With the increasing of the proportions of POM and Ag added into the Polymer, the bacteriostatic circle becomes larger in a certain degree, namely, the effects of resisting the Gram-positive bacteria, such as *Staphylococcus aureus*, and *Bacillus subtilis*, are still obvious.

Another embodiment of the invention is a selective infiltration thin film. The selective infiltration thin film includes a Polyethyleneimine (PEI), a Polyvinyl Alcohol (PVA), a germ resistant (e.g., a metal silver), and an inorganic metal oxide. Wherein, a Polyethyleneimine (PEI) and a Polyvinyl Alcohol (PVA) of appropriate ratio are used to make a polymer thin film, and the metal silver and the inorganic metal oxide are added to form the selective infiltration thin film. The scheme diagram of the selective infiltration thin film is shown in FIG. 3.

In practical applications, the selective infiltration thin film can be a protection material for biological and chemical protection or environment protection. The casting method is used to mix the Polyethyleneimine (PEI) and the Polyvinyl Alcohol (PVA) to form the polymer thin film having an interpenetrating network structure and gas permeability. The inorganic metal oxide can be Polyoxometalate (POM). The quantitative suspension test and the bacteriostatic ring test can be further used to test the germs resisting capability of the selective infiltration thin film, and the vapor permeability test and the chemical permeation experiment can be used to test the self-cleaning capability of the selective infiltration thin film, but not limited to these cases.

Compared with the prior arts, the invention discloses a mixture of a Polyethyleneimine (PEI) and a Polyvinyl Alcohol (PVA) of appropriate ratio to make a polymer thin film, and the metal silver and the inorganic metal oxide are added to form the self-cleaning selective infiltration thin film. Since the metal silver can effectively resist the bacteria, viruses, fungi, and fungal, and the inorganic metal oxide with photo-catalytic activity can provide the organic pollutants catalysis and degradation effect, the metal silver and the inorganic metal oxide can be combined to obtain the selective infiltration thin film capable of resisting germs and self-cleaning.

After the test, it can be found that the selective infiltration thin film provided by the invention will have a good effect of resisting biological bacteria and chemical poisons

What is claimed is:

1. A method of manufacturing a selective infiltration thin film of a specific, pre-determined diameter D (in mm) of the bacteriostatic circle at a constant temperature 37° C., comprising the steps of
  (a) mixing Polyethyleneimine (PEI) and Polyvinyl Alcohol (PVA) with a casting method for a polymer thin film;
  (b) setting a value of r ranging between 0 and 1, and r∈R, or real numbers;
  (c) Obtaining a value of M in Pearson's product-moment formula, M=r·D, and adding an amount M of an inorganic metal oxide, namely, Polyoxometalate (POM) into the polymer thin film;
  (d) forming the selective infiltration thin film,
  wherein the desired diameter D of the bacteriostatic circle of the thin film corresponds to a diameter D' obtained according to the following steps:
    i) sterilizing a wafer paper spindles (6 mm) at 120° C.,
    ii) immersing the wafer paper spindles into the thin film,
    iii) disposing the wafer paper spindles in a vaccinated strain ($10^5$ cfu/ml) Mueller Hinton ager (MHA) disk, and
  after 24 hours of training of the wafer paper spindles in a constant temperature incubator at 37° C., measuring the diameter D' of the bacteriostatic circle.

2. A method of manufacturing a selective infiltration thin film of a specific, pre-determined diameter D (in mm) of the bacteriostatic circle at a constant temperature 37° C., comprising the steps of
  (a) mixing Polyethyleneimine (PEI) and Polyvinyl Alcohol (PVA) with a casting method for a polymer thin film;
  (b) setting a value of r ranging between 0 and 1, and r∈R, or real numbers;
  (c) Obtaining a value of M in Pearson's product-moment formula, M=r·D, and
  adding an amount M of a germ resistance containing silver ion (Ag+) into the polymer thin film;
  (d) forming the selective infiltration thin film,
  wherein the desired diameter D of the bacteriostatic circle of the thin film corresponds to a diameter D' obtained according to the following steps:
    iv) sterilizing a wafer paper spindles (6 mm) at 120° C.,
    v) immersing the wafer paper spindles into the thin film,
    vi) disposing the wafer paper spindles in a vaccinated strain ($10^5$ cfu/ml) Mueller Hinton ager (MHA) disk, and
  after 24 hours of training of the wafer paper spindles in a constant temperature incubator at 37° C., measuring the diameter D' of the bacteriostatic circle.

* * * * *